(12) United States Patent
Ivasyuk et al.

(10) Patent No.: US 11,710,147 B2
(45) Date of Patent: Jul. 25, 2023

(54) SYSTEM AND METHOD FOR SCANNING A MOBILE COMPUTING DEVICE FOR INSTALLED APPLICATIONS

(71) Applicant: Capital One Services, LLC, McLean, VA (US)

(72) Inventors: Anatoly Ivasyuk, Falls Church, VA (US); Patrick Zearfoss, Leesburg, VA (US); Joshua McGarity, Washington, DC (US); Deborah Nally, Williamsburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/140,392

(22) Filed: Jan. 4, 2021

(65) Prior Publication Data

US 2022/0215420 A1 Jul. 7, 2022

(51) Int. Cl.
*G06Q 30/02* (2023.01)
*G06Q 30/0207* (2023.01)
*G06Q 30/0235* (2023.01)
*G06F 16/955* (2019.01)
*H04M 1/72406* (2021.01)

(52) U.S. Cl.
CPC ..... *G06Q 30/0239* (2013.01); *G06F 16/9566* (2019.01); *G06Q 30/0235* (2013.01); *G06Q 30/0236* (2013.01); *H04M 1/72406* (2021.01)

(58) Field of Classification Search
CPC .......... G06Q 30/0235; G06Q 30/0236; G06Q 30/0239; G06F 16/9566; H04M 1/72406
USPC ................. 705/14.35, 14.36, 14.39
See application file for complete search history.

(56) References Cited

U.S. PATENT DOCUMENTS

| | | | | |
|---|---|---|---|---|
| 5,341,496 A | * | 8/1994 | Middledorp | G06F 13/385 714/2 |
| 8,396,759 B2 | * | 3/2013 | Mehta | G06Q 30/0282 705/26.7 |
| 8,433,620 B2 | * | 4/2013 | Futty | G06Q 30/0282 705/26.7 |
| 9,230,276 B2 | * | 1/2016 | Mehta | G06Q 30/0261 |

(Continued)

OTHER PUBLICATIONS

Lin, Jovian, et al., New and Improved: Modeling Versions to Improve App Recommendation, SIGIR '14, Jul. 6-11, 2014, downloaded Feb. 18, 2022 from https://dl.acm.org/doi/pdf/10.1145/2600428.2609560 (Year: 2014).*

(Continued)

*Primary Examiner* — Scott D Gartland
(74) *Attorney, Agent, or Firm* — Perkins Coie LLP

(57) ABSTRACT

Systems, methods, and computer-readable storage media for scanning a mobile computing device for applications produced by partnered entities and providing benefits when those applications are found. An exemplary system does this by accessing a list of applications and associating each application with a respective entity which has a rewards program linked to a specific entity. The system issues a request for application information of the applications which are installed on the mobile computing device, identifies applications that match the list of applications in the data record, and generates at least one notification based on the identified applications and the rewards program. The system then displays the at least one notification.

19 Claims, 3 Drawing Sheets

(56) References Cited

U.S. PATENT DOCUMENTS

| | | | |
|---|---|---|---|
| 2013/0085886 A1* | 4/2013 | Satish | G06Q 30/02 |
| | | | 705/26.7 |
| 2013/0198011 A1 | 8/2013 | Corner et al. | |
| 2015/0100463 A1* | 4/2015 | Drazin | G06Q 30/0641 |
| | | | 705/27.1 |
| 2016/0357537 A1* | 12/2016 | Falkenburg | H04L 67/06 |
| 2017/0353603 A1* | 12/2017 | Grunewald | G06Q 30/0631 |
| 2019/0317941 A1* | 10/2019 | Razallian | G06F 16/148 |

OTHER PUBLICATIONS

Windows Support, Change your app recommendation settings in Windows, indicated by metadata on Chrome as being available since Sep. 17, 2018, downloaded Oct. 13, 2022 from https://support.microsoft.com/en-us/topic/f21b5c60-e996-4ee4-c2cf-b4a90c0bef9b (Year: 2022).*

International Search Report and Written Opinion for International Application No. PCT/US2022/011168 dated Feb. 3, 2022.

* cited by examiner

SYSTEM AND METHOD FOR SCANNING A MOBILE COMPUTING DEVICE FOR INSTALLED APPLICATIONS

BACKGROUND

1. Technical Field

The present disclosure relates to scanning a mobile computing device for installed applications, and more specifically to scanning the mobile computing device for applications produced by other entities and utilizing information from one application with another application.

2. Introduction

Applications on mobile devices ("apps") are generally configured to operate alone, without regard to other applications which are installed on the device. While in some cases an app may request permission to access the camera or photographs, no functional changes to the app occur if the permission is denied—instead, the user is simply denied the ability to use the camera or photos within the application.

Integration between companies outside of apps is common. An example of such integration can include rewards available from a company to individuals or organizations for using products made by a partner of the company, such as a video streaming service (e.g., Hulu®) providing a free or discounted subscription if an individual has a music streaming service subscription (e.g., Spotify®). As another example, employees of an organization may be entitled to discounted car rentals from a specific car rental company who has partnered with their organization.

However, individuals are often unaware of all the potential benefits to which they may be entitled. For example, as partnerships are made or expire, it can be difficult for individuals to keep track of the additional benefits from other organizations to which they are entitled. This problem is compounded with apps on mobile devices, because at present there is no technical mechanism which allows apps to change operation based on the presence of other known apps and utilize information about the known apps based on a common presence or usage of another app.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: accessing, via an application on a mobile computing device installed on the mobile computing device, a data record stored on a database, the data record including a list of applications, and associating each application within the list of applications with a respective entity, the respective entity having a rewards program linked to a specific entity; on a periodic basis via a processor of the mobile computing device: retrieving, from a Real Time Clock (RTC) within the mobile computing device, a current time and date; comparing, via the processor, the current time and date to a previous time and date of a most recent search execution, resulting in a time since last search; and when the time since last search exceeds a threshold amount of time associated with the periodic basis, replacing, within a non-transitory computer-readable storage medium of the mobile computing device, the list of applications with an updated list of applications; issuing a request, from the application to an operating system of the mobile computing device, for application information of applications installed on the mobile computing device; analyzing the application information received from the operating system to identify applications that match the list of applications in the data record resulting in identified applications; generating, via the processor, at least one notification based on the identified applications and the rewards program; and displaying, via a display of the mobile computing device, the at least one notification.

A system configured to perform the concepts disclosed herein can include: a processor; a display; and a non-transitory computer-readable storage medium having instructions stored which, when executed by the processor, cause the processor to perform operations comprising: downloading, from a remotely located computer, a list of applications, wherein each application within the list of applications is a separately operating a computer algorithm which can be stored within the non-transitory computer-readable storage medium, and wherein each application within the list of applications is associated with a shared a rewards program linked to a given entity; identifying, within the non-transitory computer-readable storage medium, installed applications from the list of applications, resulting in found applications and missing applications; generating at least one message based on at least one of the found applications and the missing applications; and displaying, via the display, the at least one message.

A non-transitory computer-readable storage medium configured as disclosed herein can have instructions stored which, when executed by a computing device, cause the computing device to perform operations which include: downloading, from a server, a list of applications, wherein each application within the list of applications is a separately operating a computer algorithm which can be stored within the non-transitory computer-readable storage medium, and wherein each application within the list of applications is associated with a shared a rewards program linked to a given entity; detecting, within the non-transitory computer-readable storage medium, installed applications from the list of applications, resulting in the installed applications and not-installed applications; generating at least one message based on at least one of the installed applications and the not-installed applications; and displaying the at least one message.

DETAILED DESCRIPTION

Figure 1:
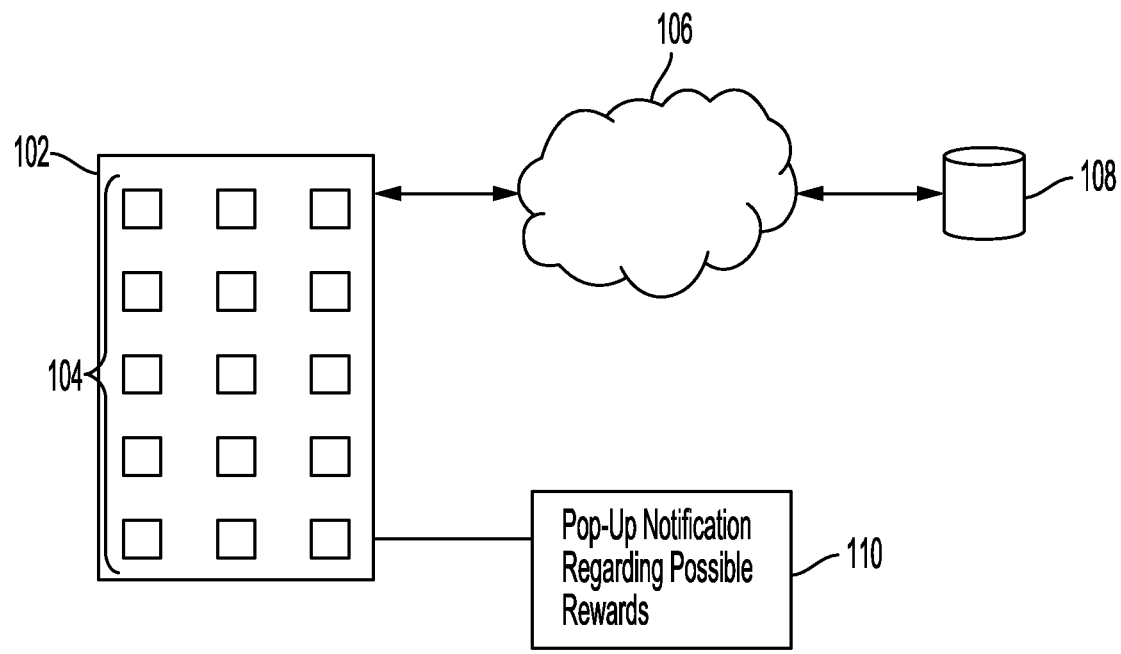
FIG. 1 illustrates an example of a mobile computing device interacting with a database to identify potential rewards.

Various embodiments of the disclosure are described in detail below. While specific implementations are described, it should be understood that this is done for illustration purposes only. Other components and configurations may be used without parting from the spirit and scope of the disclosure.

One exemplary, non-limiting, practical application to the technical problem noted above is for a given application, installed on an individual's mobile device, to search the memory of the mobile device for other installed applications. The results of the search may be used by the inquiring app in its operations. In one example, the results of the search are used as inputs and different information or recommendations may be returned based on the findings of the search. The function of the app can change how the user is notified of potential benefits associated with found applications, and further change how the user is notified of potential benefits associated with applications which are not currently installed. In other words, the operation of the application initiating the search changes based on which apps are found and which are not.

For example, the given application can request a list of application names, or other identification information, for the other applications installed on a device, or use a previously received list. The given application can request information from a remotely located rewards database regarding potential rewards, benefits, or other incentives associated with each respective application in the list of application names. The given application can then execute a series of requests, via the processor to the mobile device memory, requesting the names or identification of applications stored in the mobile device memory. As the names of applications stored in the mobile device memory are received, the processor executes a comparison of the received name of an installed application against the names on the list, thereby identifying which of the applications on the received list are installed on the mobile device. Depending on specific configurations and embodiments, the app can change how the user is notified of potential benefits associated with found applications, and how the user is notified of potential benefits associated with applications which are not currently installed. For example, a notification can be displayed to the user of the mobile device indicating potential rewards for installing, linking, and/or using apps associated with the given application based on the search and the information received in the rewards database. In some configurations, sending the notification can include resolving, between the mobile device and the rewards database, what rewards are available based on behavior or status of an owner of the mobile device, as well as which applications are stored in the memory of the mobile device. The search for installed mobile applications can be executed at a given frequency (daily, weekly, etc.), when the app begins running, or when changes to the list of reward apps changes.

Searching for such as the name, classification, or other information about installed applications can, for example, be performed using commands integrated into the operating system of the mobile device being used. For example, on Android® operating systems, classes such as PackageInfo, PackageManager, and ApplicationInfo can provide information related to application packages which are currently installed on a mobile device.

The installed applications and the applications included in the list of applications to-be-searched-for can be organized into categories. For example, applications can be organized into categories such as music, gaming, travel, restaurants, gas, clothing, retail, common ownership, etc. Some rewards may be associated with having a certain number of installed applications which also fall within an identified category. For example, there could be additional rewards offered for having all the Alphabet® related applications installed, such as YouTube®, Google®, GMail®, etc., in addition to any rewards available to a single application. Likewise, there could be rewards offered for having multiple applications associated with travel applications installed, such as the Delta® application as well as the Southwest Airlines® applications.

In some cases, the rewards available may be distinct if an application on the list is installed, but no account has been created and registered with the respective applications. For example, rewards may be available to a user having the Spotify® application installed on their mobile device. However, there may be distinct rewards available if the user has the Spotify® application installed on their mobile device and has a registered and/or premium (paid for) Spotify® account. In such configurations, the searching for additional applications can, in addition to determining if the respective application is installed in the mobile device memory, have additional steps of determining if a registered account exists with a given application. To do so, the searching application can request, from the installed applications, proof of registration and/or authorization for using the installed application.

While the search for installed applications on the mobile device will occur via the processor(s) installed within the mobile device, remotely located back end systems store, update, and communicate the information used by the mobile device to properly execute the search and identify what rewards are available. For example, a first database can store partnered entities in a record. The names of their respective applications, and/or potential rewards associated with having those applications installed on the mobile device are associated with the entities in the record. A second database can contain a record of the categories of the respective applications and potential rewards associated with the categories of rewards are associated with the applications in the record. When a mobile device requests, from a server or other system storing the first database, the applications associated with the partnered entities, the system can reply with the current list of applications and/or rewards. In some configurations a single database can store both the list of applications and associated rewards, whereas in other configurations distinct databases can store the respective information. The system can reply, to a request regarding categorization, with the list of categories and/or associated rewards from those one or more databases. In some configurations, a request for a current list of applications can automatically result in a reply which includes both the list of current applications/rewards as well as the list of categories/rewards.

When the back-end system receives a request for the current list of applications, an authentication process can begin to verify that the request is legitimate and authorized. In such circumstances, the authentication process can use multi-factor authentication (such as a text or email code transmitted to the mobile device), asymmetrical encryption (where an authorized application has a public or private key which allows for communication with the back end system, password, captcha, or other forms of authentication. The back-end system can require completion of the authentication process prior to responding to any queries.

As the back-end systems are updated with new partners, or termination of certain partnerships, the current lists of applications/rewards and/or categories/rewards can be updated. In some configurations, an update can cause the system to transmit the updated lists to mobile devices. This transmittal of the updated lists can occur immediately, the next time the application is executed by a mobile device user, and/or at another time. In some configurations, the user of the mobile device may be presented with an option to check or verify if additional rewards are available, which can trigger transmittal of a request across the network to the back-end system and a subsequent response.

Consider the following example. A user has an app installed on their smartphone associated with their credit card, a "credit card app." The credit card company has also established partnerships with various businesses, such that if the user has installed on their smartphone both the credit card app and an app associated with a partnered business, a reward is available for the user. The credit card app can then send a notification (such as a "pop-up" notification on the smartphone screen) informing the user of the potential reward.

To determine if one or more apps associated with the partnered business are installed on the smartphone, the credit card app sends a request, across the Internet or another network, to a database which has a list of known partnered apps. The database can respond to the smartphone with a list of partnered apps, which the credit card app can receive and store in memory of the smartphone. The credit card app can then compare the list of partnered apps with the apps installed on the smartphone by comparing names of the apps stored within the memory of the smartphone with names of the partnered apps on the list. When a match occurs, the credit card app can determine if the user is using both apps in a way that provides rewards and inform the smartphone user if not. Similarly, if the user does not have a partnered app installed, the credit card app can inform the smartphone user that rewards are available for downloading and using the partnered app.

How the list of partnered apps is transmitted from the database and received by the smartphone can vary according the Operating System (OS) of the smartphone. For example, in some OSs, the database storing a list of known apps can only communicate a limited number of partnered app names to the smartphone for comparison. In such configurations, the database can select a portion of all the partnered apps and send a shortened list of partnered apps corresponding to that portion. Over time, the shortened list can be updated or modified to include different partnered apps which were not included in the original shortened list. These updates can occur every time the credit card app initiates, at scheduled intervals, and/or each time the credit card app is updated.

In other configurations of the OS, a complete list of all the partnered apps can be downloaded at once, with changes or modifications to the list occurring periodically. In some cases, a change to the database with which the credit card app communicates regarding a partnership or rewards can cause transmission of an updated list of partnered apps to be sent to the smartphone. A comparison of the installed apps on the smartphone with the list of partnered apps can occur at a known frequency, upon initiating operation of the app, when changes to the complete list of partnered apps occurs, and/or at other times.

To perform the periodic search, the credit card app can instruct the smartphone processor to retrieve, from a Real Time Clock (RTC) within the smartphone, a current time and date. The credit card app can further instruct the smartphone processor to compare the current time and date retrieved from the RTC to a previous time and date of the most recent previous search, resulting in a time since last search. If the time since last search is longer than a predetermined threshold (such as a day, a week, etc.), then the smartphone processor executes a search within the memory of the smartphone for partnered apps on the list received from the database.

While the previous example was regarding a smartphone, any type of computing device (including laptops, tablets, smartwatches, desktops, etc.) can be configured to practice the methods and embodiments disclosed herein. In addition, while the previous example used an example "credit card app," the "base app" which initiates the searching for other apps on the mobile computing device can belong to any other type of organization. For example, the base app can belong to a restaurant, a retailer, a travel company (such as an airline, car rental company, or booking agency (such as Orbitz® or Travelocity®)).

Turning to the figures, FIG. 1 illustrates an example of a mobile computing device 102 interacting with a rewards system 108 to identify potential rewards. A customer may operate mobile computing device 102, which may be a tablet, a smartphone, a multifunctional watch, a pair of multifunctional glasses, a tracking device, or any suitable device with computing capability. Mobile computing device 102 may include memory, a processor(s), display(s), and/or other specialized hardware that is configured to execute one or more methods of the disclosed embodiments.

Mobile computing device 102 may have an application installed thereon, which may enable mobile computing device 102 to access information stored in rewards system 108, such as, for example, financial information related to recent purchase transactions, discounts, account information, rewards program information and/or the like. The application may configured to notify 110 the user by sending synthesized voice signals, by sending a user an e-mail or a text message, and/or by any other notification style as known in the art. In addition, the mobile computing device 102 may, when instructed by the processor via the application's execution, cause graphical display of the information gathered from the reward system 108 on one or more display surfaces of the mobile computing device 102.

A user may operate mobile computing device 102 to perform one or more operations consistent with disclosed embodiments. In one aspect, a user may be a customer of a financial service provider that may be associated with rewards system 108. For instance, a financial service provider may maintain a financial service account (e.g., credit card account) for the customer that the customer may use to purchase goods and/or services online or at brick-and-mortar locations associated with a merchant.

In the illustrated example, the mobile computing device 102 communicates with the rewards system 108 across a network 106, such as the Internet, to receive a list of partnered apps which, when installed or used on the mobile computing device 102, can provide rewards to the owner of the mobile computing device 102 based on a relationship between two or more entities which created the apps. The mobile computing device 102 compares the names of the installed apps 104 with the list of partnered apps, and based the comparison, can change how the app will inform the user of potential benefits. For example, as illustrated a display the produces a pop-up notification 110 indicating possible rewards which are available. However, in other instances, the notification 110 may only appear when one or more of the apps associated with the partnership are opened, when an updated list of partnered apps is received, or when a new comparison of installed apps 104 to partnered apps occurs. How the app operates, in any given situation, therefore depends on the information obtained regarding other installed applications.

In some configurations, the user's identification information may be associated with the user's account and stored in a reward system 108 located remotely from the mobile computing device 102. The reward points that are earned, awarded, or bought may be accumulated and may be associated with the user's identification information in the reward system 108. The reward system 108 may contain one or more of the following modules: an authentication module, an account module, and a reward module. The authentication module, the account module, and the reward module may communicate with some or all of the modules and with the mobile computing device 102. The modules of the reward system may be part of a single system, or the modules may be physically or logically separated or provided on the mobile computing device. The reward system 108 may be operably connected to the network 106 so that the reward system modules are able to receive signals from the network 106 and generate signals sent to and through the network 106.

The authentication module may receive authentication information (e.g., as signals from the network 106), and may attempt to match the authentication information to a record in the reward system 108. In an embodiment, the authentication information may be received as encrypted ciphertext and decrypted according to protocols well known in the art. If the authentication information matches identification information of mobile computing device 102 in the reward system 108, then the mobile computing device 102 may be allowed to proceed. If the authentication information does not match identification information of mobile computing device 102 in the reward system 108, the mobile computing device 102 may not be not allowed to proceed. The account module may contain a plurality of user's account information. For example, the account module may contain the user's unique number, the user's telephone number, the user's cellular telephone number, and the user's e-mail address. In one exemplary embodiment, the account module may store a plurality of users and their related account information in a database. The user's account information may include, but is not limited to, the amount of reward points that the mobile computing device 102 has accumulated.

The reward module may contain information on one or more of the possible rewards that are available from the financial card company. For example, the reward module may include the name of a store (e.g., Store A at 1550 Maple Avenue, Richmond, Va.), retailer (Store A), or app name for which the reward may be received, a description of the reward, and the number of reward points received. In one exemplary embodiment, the reward module may store a plurality of items and associated information in a database.

Figure 2:
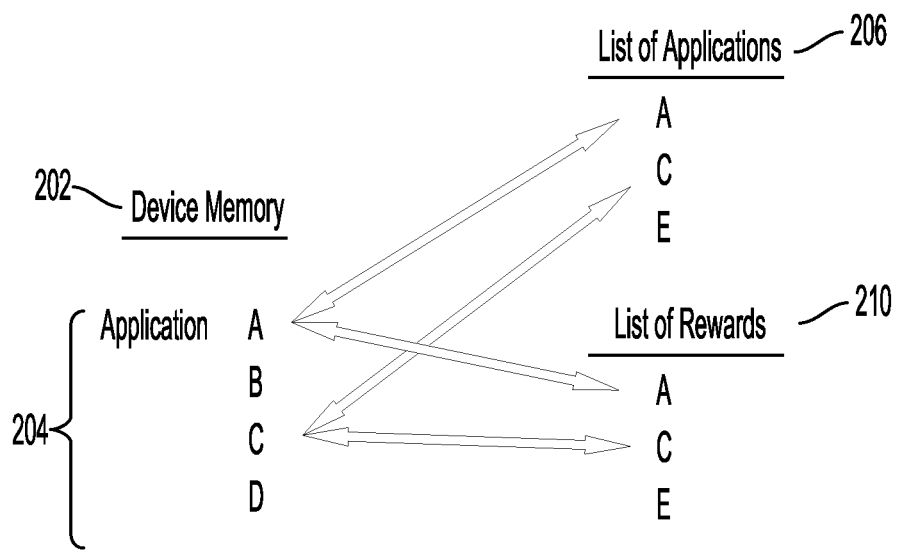
FIG. 2 illustrates a comparison of applications stored memory of a mobile computing device with a list of known applications.

FIG. 2 illustrates a comparison of applications 204 stored memory 202 of a mobile computing device with a list of known applications 206 and a list of rewards 210. In this example, the computing device has applications A, B, C, and D 204 installed in the Device Memory 202. The list of applications 206 with possible rewards or benefits lists apps A, C, and E. The application performing the search sends, via the processor, a request to locations within the Device Memory 202 for names or identifications of installed applications 204. In some configurations, the requests can be based on specific memory locations, where the search request captures the name of an application stored at a specific portion of the memory. As a name of an application (as illustrated, A, B, C, or D) stored in the mobile device memory 202 is received, the processor executes a comparison of the received name against the names on the list 206 (as illustrated, A, C, or E). If the name of the installed application is found, the application can proceed to identify rewards or benefits 210 associated with having the application install. The list of rewards 210 can be stored in the same database as the list of applications 206, or in a separate database. For example, in some configurations the identification of rewards or benefits 210 can require an additional call to an external database to identify what reward, whereas in yet other configurations the reward information can be provided with the list of known applications 206. As illustrated, for example, a notification could be provided to the user of the computing device regarding potential rewards for using, linking, or otherwise engaging with apps A and/or C. In addition, a notification could be provided to the user indicating potential rewards for installing, using, linking, and/or otherwise engaging with an application not installed on the mobile device, such as app E.

Figure 3:
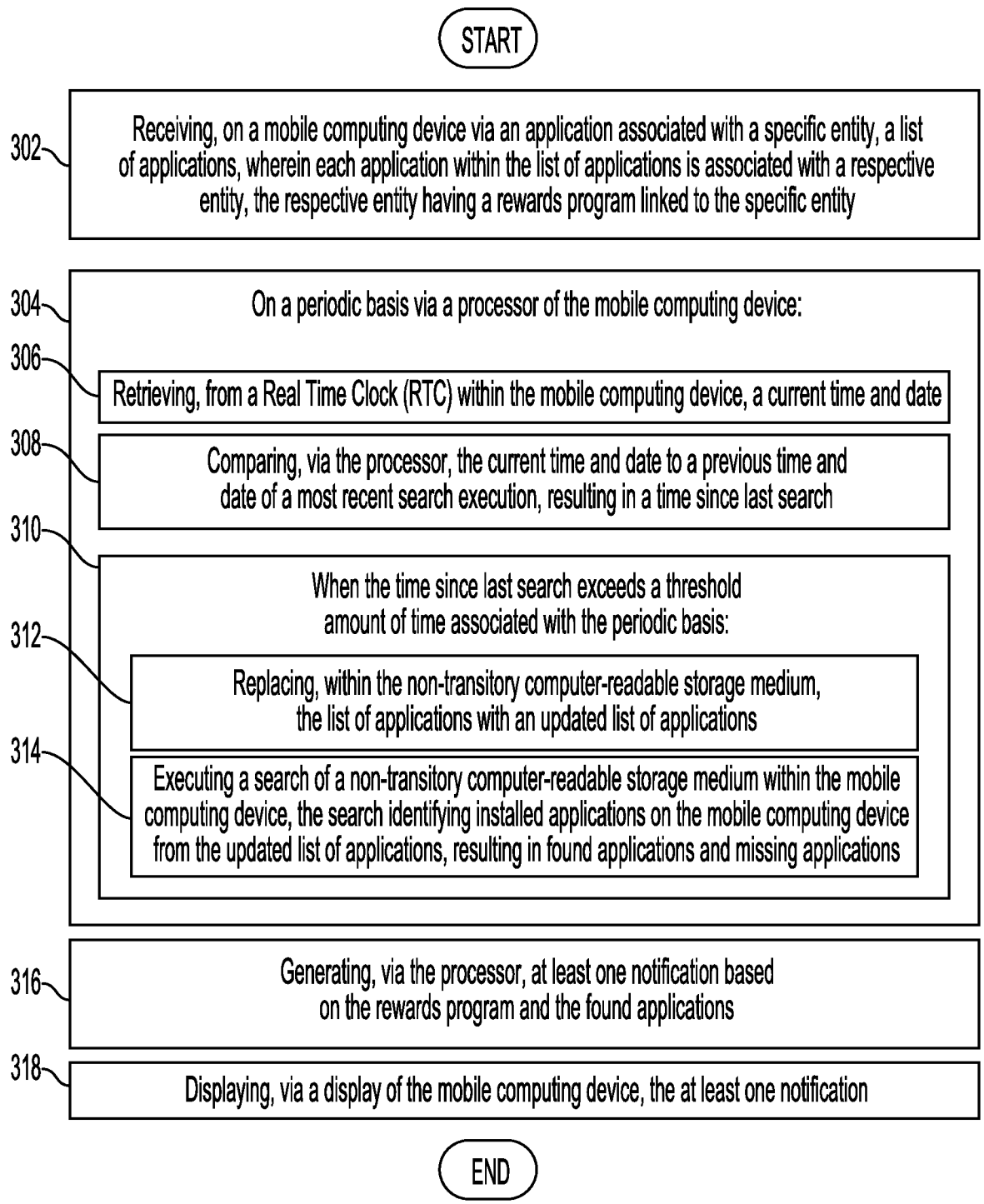
FIG. 3 illustrates an example method embodiment.

FIG. 3 illustrates an example method embodiment. As illustrated, the method can include receiving, on a mobile computing device via an application associated with a specific entity, a list of applications, wherein each application within the list of applications is associated with a respective entity, the respective entity having a rewards program linked to the specific entity (302). On a periodic basis via a processor of the mobile computer (304): the processor can retrieve, from a Real Time Clock (RTC) within the mobile computing device, a current date and time (306) and compare, via the processor, the current time and date to a previous time and date of a most recent search execution, resulting in a time since last search (308). When the time since last search exceeds a threshold amount of time associated with the periodic basis (310), the processor replaces, within the non-transitory computer-readable storage medium, the list of applications with an updated list of applications (312), and executes a search of a non-transitory storage medium within the mobile computing device, the search identifying installed applications on the mobile computing device from the updated list of applications, resulting in found applications and missing applications (314). The non-transitory storage medium(s) within the mobile computing device can be a single non-transitory storage medium or multiple non-transitory storage mediums, depending on specific configuration. The processor generates at least one notification based on the rewards program and the found applications (316), and displays, via a display of the mobile computing device, the at least one notification.

Another, non-illustrated example of a method embodiment could include: accessing, via an application on a mobile computing device installed on the mobile computing device, a data record stored on a database, the data record including a list of applications, and associating each application within the list of applications with a respective entity, the respective entity having a rewards program linked to a specific entity; on a periodic basis via a processor of the mobile computing device: retrieving, from a Real Time Clock (RTC) within the mobile computing device, a current time and date; comparing, via the processor, the current time and date to a previous time and date of a most recent search execution, resulting in a time since last search; and when the time since last search exceeds a threshold amount of time associated with the periodic basis, replacing, within a non-transitory computer-readable storage medium of the mobile computing device, the list of applications with an updated list of applications; issuing a request, from the application to an operating system of the mobile computing device, for application information of applications installed on the mobile computing device; analyzing the application information received from the operating system to identify applications that match the list of applications in the data record resulting in identified applications; generating, via the processor, at least one notification based on the identified applications and the rewards program; and displaying, via a display of the mobile computing device, the at least one notification.

In some configurations, the threshold amount of time can be one of a day, a week, or a month.

In some configurations, the list of applications is limited to a maximum number of possible applications, such as fifty or one hundred.

In some configurations, the method can further include, prior to receiving the list of applications and executing the search, displaying a prompt via a display of the mobile computing device, the prompt requesting permission to download the list of applications and execute the search. Without the express permission from the user of the mobile computing device, the search of the mobile computing device would not occur.

In some configurations, the executing of the search occurs when the application is updated.

In some configurations, the list of applications comprises URL (Uniform Resource Locator) prefixes associated with known applications.

In some configurations, the method can further include: identifying, via the processor based on the found applications, a category of applications found on the mobile computing device; identifying, via the processor based on the list of applications, the missing applications, and the category, potential rewards associated with a missing application belonging to the category; and generating, via the processor, a message regarding the potential rewards.

Similarly, in some configurations, the method can further include: comparing the application information to the list of applications, resulting in found applications and missing applications; identifying, via the processor based on the found applications, a category of applications found on the mobile computing device; retrieving, via the processor, a payment mechanism associated with an owner of the mobile computing device; identifying, via the processor based the category and the payment mechanism, potential rewards associated with a different payment mechanism; and generating, via the processor, a message regarding the potential rewards.

In some configurations, the method can further include receiving, at the processor, a list of rewards provided by the rewards program, wherein the list of rewards is periodically updated.

Likewise, in some configurations the method can further include: modifying, via the processor modifying instructions stored within the non-transitory computer-readable storage medium, at least one of the executing of the search, the generating of the at least one notification, or the displaying of the at least one notification, based on behavior of at least one user to at least one previous notification.

In some configurations, the database can store: the list of applications; a current list of entities respectively associated with each application in the list of applications; and the rewards program, wherein each entity in the list of entities has specific rewards offered for using the application associated with the respective entity. In such configurations, each entity in the list of entities can be categorized into at least one category within a plurality of categories, and the rewards program rewards for each entity in the list of entities can be based, at least in part, on the at least one category to which each entity is categorized.

Figure 4:
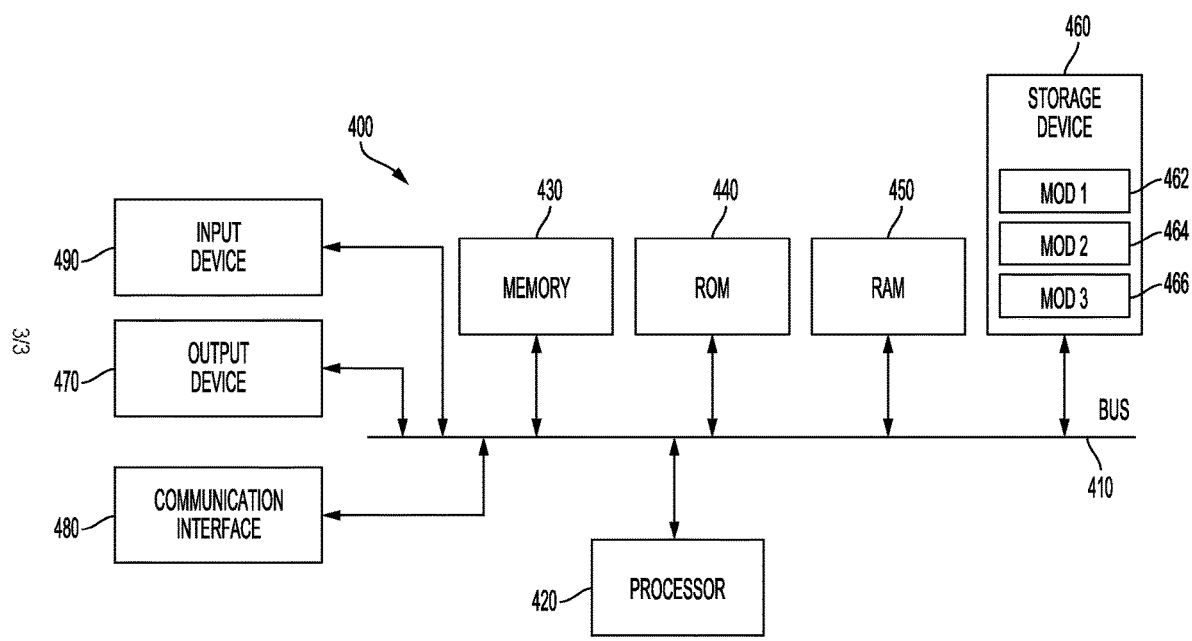
FIG. 4 illustrates an example computer system.

With reference to FIG. 4, an exemplary system includes a general-purpose computing device 400, including a processing unit (CPU or processor) 420 and a system bus 410 that couples various system components including the system memory 430 such as read-only memory (ROM) 440 and random access memory (RAM) 450 to the processor 420. The system 400 can include a cache of high-speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
    accessing, via an application on a mobile computing device installed on the mobile computing device, a data record stored on a database, the data record including a list of applications and associating each application within the list of applications with a respective entity that has a rewards program linked to a specific entity;
    on a periodic basis via a processor of the mobile computing device, executing instructions stored within a non-transitory computer-readable storage medium of the mobile computing device that:
        retrieves, from a Real Time Clock (RTC) within the mobile computing device, a current time and date;
        compares, via the processor, the current time and date to a previous time and date of a most recent search execution, resulting in a time since last search; and
        when the time since last search exceeds a threshold amount of time associated with the periodic basis, executes a search that identifies and replaces, within the non-transitory computer-readable storage medium of the mobile computing device, the list of applications with an updated list of applications; and
    at each of the periodic basis and the accessing the data record:
        issuing a request, from the application to an operating system of the mobile computing device, for application information of applications installed on the mobile computing device;
        analyzing the application information received from the operating system to identify an installed application set of installed applications that match the list of applications in the data record;
        identifying, via the processor, potential rewards for downloading a first non-installed application that (i) is related to a first rewards program of the rewards programs and (ii) belongs to an application category of one or more installed applications of the installed application set, wherein the first non-installed application is identified based on the application category of the one or more installed applications and the rewards programs of the respective entities;
        generating, via the processor, at least one notification indicating the potential rewards for downloading the first non-installed application related to the first rewards program; and
        displaying, via a display of the mobile computing device, the at least one notification.

2. The method of claim 1, wherein the threshold amount of time is one of a day, a week, or a month.

3. The method of claim 1, wherein the list of applications is limited to a maximum number of possible applications.

4. The method of claim 3, wherein the maximum number of possible applications is fifty.

5. The method of claim 1, wherein the list of applications comprises URL (Uniform Resource Locator) prefixes associated with known applications.

6. The method of claim 1, further comprising:
    retrieving, via the processor, a payment mechanism associated with an owner of the mobile computing device;
    identifying, via the processor, based the application category and the payment mechanism, other potential rewards associated with using a different payment mechanism; and
    generating, via the processor, a message regarding the potential rewards associated with using the different payment mechanism.

7. A system comprising:
    a processor;
    a display; and
    a non-transitory computer-readable storage medium having instructions stored which, when executed by the processor, cause the processor to perform operations comprising:
        downloading, from a remotely located computer, a list of applications, wherein each application within the list of applications is a separately operating a computer algorithm which can be stored within the non-transitory computer-readable storage medium, and wherein the list of applications includes a plurality of applications associated with a shared rewards program linked to a given entity;
        identifying, using the list of applications, installed applications that are installed within the non-transitory computer-readable storage medium and one or more non-installed applications related to the shared rewards program, the one or more non-installed applications being identified from the list of applications as not being installed on the non-transitory computer-readable storage medium;
        generating at least one message related to potential rewards of the shared rewards program for using, linking, or engaging with the one or more non-installed applications related to the shared rewards program; and
        displaying, via the display, the at least one message.

8. The system of claim 7, further comprising:
a Real Time Clock (RTC),
wherein the non-transitory computer-readable storage medium has additional instructions stored which, when executed by the processor, cause the processor to perform operations comprising:
retrieving, via the RTC, a current time; and
replacing, at predetermined times, within the non-transitory computer-readable storage medium, the list of applications with an updated list of applications based on the current time.

9. The system of claim 7, the non-transitory computer-readable storage medium having additional instructions stored which, when executed by the processor, cause the processor to perform operations comprising:
prior to executing the downloading of the list of applications and the identifying of the installed applications, requesting permission, via the display, to download the list of applications and identify the installed applications.

10. The system of claim 7, the non-transitory computer-readable storage medium having additional instructions stored which, when executed by the processor, cause the processor to perform operations comprising:
identifying application categories of the installed applications;
identifying, based on the list of applications and the application categories, unclaimed rewards associated with a non-installed application that falls within a first category of the application categories; and
generating a notification regarding the unclaimed rewards associated with the non-installed application falling within the first category of the application categories.

11. The system of claim 7, wherein the downloading and the identifying are performed in accordance with a predetermined basis, the predetermined basis including a periodic interval or a predetermined automated trigger.

12. The system of claim 11, wherein the predetermined automated trigger is an update to an application on the non-transitory computer-readable storage medium.

13. The system of claim 7, wherein the at least one message includes an indication to download a non-installed application related to the shared rewards program and install the non-installed application on the non-transitory computer-readable storage medium.

14. A non-transitory computer-readable storage medium having instructions stored which, when executed by one or more processors of a computing device, cause operations comprising:
downloading, from a server, a list of applications, wherein each application within the list of applications is a separately operating a computer algorithm which can be stored within the non-transitory computer-readable storage medium, and wherein the list of applications includes a plurality of applications associated with a shared rewards program linked to a given entity;
detecting, using the list of applications, installed applications that are installed on the computing device and one or more non-installed applications related to the shared rewards program, the one or more non-installed applications being identified from the list of applications as not being installed on the computing device;
generating at least one message related to potential rewards of the shared rewards program for using the one or more non-installed applications related to the shared rewards program; and
displaying the at least one message.

15. The non-transitory computer-readable storage medium of claim 14, wherein the downloading and the detecting are performed in accordance with a predetermined basis, the predetermined basis including a periodic interval or a predetermined automated trigger.

16. The non-transitory computer-readable storage medium of claim 15, wherein the predetermined automated trigger is an update to an application on the computing device.

17. The non-transitory computer-readable storage medium of claim 14, wherein the at least one message includes an indication to download a non-installed application related to the shared rewards program and install the non-installed application on the computing device.

18. The non-transitory computer-readable storage medium of claim 14, the operations further comprising:
retrieving, via a real time clock, a current time; and
replacing, at predetermined times, within the computing device, the list of applications with an updated list of applications based on the current time.

19. The non-transitory computer-readable storage medium of claim 14, the operations further comprising:
identifying application categories of the installed applications;
identifying, based on the list of applications and the application categories, unclaimed rewards associated with a non-installed application that falls within a first category of the application categories; and
generating a notification regarding the unclaimed rewards associated with the non-installed application falling within the first category of the application categories.

* * * * *